(12) United States Patent
McLean et al.

(10) Patent No.: US 11,724,791 B2
(45) Date of Patent: Aug. 15, 2023

(54) ENHANCED DESIGN FOR STRINGER RUNOUT TERMINATIONS ON COMPOSITE PANELS

(71) Applicant: The Boeing Company, Chicago, IL (US)

(72) Inventors: Andrew M. McLean, Mukilteo, WA (US); Clinton L. Johnson, Sammamish, WA (US); Ryan S. McClarty, Snohomish, WA (US); Andreas Panayi, Moscow (RU)

(73) Assignee: The Boeing Company, Chicago, IL (US)

( * ) Notice: Subject to any disclaimer, the term of this patent is extended or adjusted under 35 U.S.C. 154(b) by 333 days.

(21) Appl. No.: 16/595,752

(22) Filed: Oct. 8, 2019

(65) Prior Publication Data
US 2021/0101669 A1    Apr. 8, 2021

(51) Int. Cl.
*B64C 3/18* (2006.01)
*B64F 5/10* (2017.01)
*B64C 3/26* (2006.01)

(52) U.S. Cl.
CPC ............... *B64C 3/182* (2013.01); *B64C 3/26* (2013.01); *B64F 5/10* (2017.01)

(58) Field of Classification Search
CPC . B64C 3/182; B64C 1/064; B64C 1/12; B64F 5/10; B60R 13/0206
See application file for complete search history.

(56) References Cited

U.S. PATENT DOCUMENTS

| | | | |
|---|---|---|---|
| 6,766,984 B1 * | 7/2004 | Ochoa ....................... | B64C 1/12 244/119 |
| 8,353,479 B2 * | 1/2013 | Tacke ....................... | B64C 1/061 244/119 |

(Continued)

FOREIGN PATENT DOCUMENTS

| | | |
|---|---|---|
| EP | 2657128 | 8/2015 |
| EP | 2905220 | 8/2015 |

(Continued)

OTHER PUBLICATIONS

Schuster, Alfons, et al. "Smart Manufacturing of Thermoplastic CFRP Skins." Procedia Manufacturing, vol. 17, 2018, pp. 935-943. (Year: 2018).*

(Continued)

*Primary Examiner* — Joshua J Michener
*Assistant Examiner* — Ka Chun Leung
(74) *Attorney, Agent, or Firm* — Quinn IP Law

(57) ABSTRACT

A stringer runout configuration has a pair of fittings with each fitting having a fitting web that is configured for attachment to a stringer web of a stringer on opposite sides of a terminating end of the stringer. The stringer web has a terminating end with a curved configuration and base flanges with rounded terminating ends. Each fitting has a base flange that has a bottom surface with a first surface area and a second surface area positioned at different heights. The first surface area of each of the fittings is configured for attachment to a stringer base flange on opposite sides of a terminating end of the stringer. The second surface area of each of the fittings is configured for attachment to a composite panel surface adjacent the terminating end of the stringer. These and other detailed design features described herein enhance the capability of the runout configuration.

20 Claims, 6 Drawing Sheets

(56) References Cited

U.S. PATENT DOCUMENTS

| | | | | |
|---|---|---|---|---|
| 8,408,493 | B2* | 4/2013 | Barnard | B64C 1/26 244/119 |
| 8,974,886 | B2* | 3/2015 | Deobald | B64C 3/26 428/120 |
| 2008/0067289 | A1* | 3/2008 | Meyer | B64C 1/064 244/131 |
| 2010/0320321 | A1* | 12/2010 | Sauermann | B29C 66/43441 244/120 |
| 2012/0234978 | A1* | 9/2012 | Hernando Navas | B64C 3/26 244/132 |
| 2013/0164489 | A1 | 6/2013 | Gaitonde | |
| 2015/0053818 | A1* | 2/2015 | Charles | B64C 3/187 244/131 |
| 2015/0059142 | A1* | 3/2015 | De Jong | B29C 73/04 29/402.14 |
| 2015/0217850 | A1* | 8/2015 | Tien | B29D 99/0014 428/121 |
| 2015/0219133 | A1* | 8/2015 | Meyer | B29C 65/64 403/267 |
| 2015/0353181 | A1* | 12/2015 | Cruz Dominguez | B29D 99/0014 244/119 |
| 2016/0318214 | A1* | 11/2016 | Pinillos Mart Nez | B29C 66/131 |

FOREIGN PATENT DOCUMENTS

| | | |
|---|---|---|
| EP | 2669185 | 9/2017 |
| EP | 3533705 | 9/2019 |

OTHER PUBLICATIONS

European Search Report dated Feb. 25, 2021, issued in co-pending European Patent Application No. 20194916.1.

* cited by examiner

ENHANCED DESIGN FOR STRINGER RUNOUT TERMINATIONS ON COMPOSITE PANELS

FIELD

This disclosure pertains to a stringer runout configuration that enhances a connection between a terminating end of a composite stringer and a composite panel. More specifically, this disclosure pertains to a connecting apparatus between a terminating end or runout of a composite stiffening stringer that reduces interlaminar stresses at bondlines within the stringer and between the terminating end runout of the stringer and a composite laminate panel to which the stringer is secured and enhances the capability of the stringer runout configuration.

BACKGROUND

Composite laminate panels that are stiffened with a composite I-section stringer or blade section stringer are commonly used in the aerospace industry in the construction of aircraft primary structures such as a wing main torque box or empennage main torque box. The connection of a composite stringer terminating end or a stringer runout termination to a composite laminate panel presents a difficult challenge since high stringer axial loads must be transferred into the panel while minimizing interlaminar stresses at interfaces within the stringer and at the bondline between the stringer terminating end and the panel. The high stringer axial load resulting in high interlaminar stress can result in early onset and growth of delaminations of the composite laminate panel to stringer bondline or bondlines of the individual stringer components that would compromise aircraft structural integrity.

Existing design solutions for the connection between a composite stringer termination and a composite laminate panel suffer from poor interlaminar behavior, resulting in an inability to sustain high axial loads without the onset and growth of detrimental bondline and stringer (noodle) interlaminar delaminations. Design features such as a squared off stringer web, a squared off stringer base flange, large panel bow waves (the ridges that arise in the composite panel adjacent to the stringer flanges caused by the manufacturing process), relatively flexible runout fittings and bonded interfaces with composite tape plies all contribute to a reduced load capability.

SUMMARY

This disclosure pertains to a panel and stringer connection provided by a stringer runout configuration that overcomes the disadvantages associated with existing designs for composite stringer runout terminations secured to composite laminate panels.

The stringer runout configuration is comprised of a pair of fittings. The pair of fittings could technically be one fitting with two sections that are connected at the panel interface and extend around opposite sides of the stringer. The fittings are constructed of a metal, for example titanium. Each of the fittings is constructed with a fitting web at a central portion of the fitting. The fitting web is configured for attachment to the web of a stringer. Each of the fittings is constructed with a fitting base flange along one edge of the fitting web. The fitting base flange projects outwardly from the one edge of the fitting web. The fitting base flange of each fitting is configured for attachment to a stringer base flange of a stringer and the composite laminate panel. Each of the fittings is constructed with a fitting free edge along the fitting web on an opposite side of the fitting web from the fitting base flange.

Each fitting base flange is constructed with a bottom surface on an opposite side of the fitting base flange from the fitting web. The bottom surface of the fitting base flange has a first surface area and a second surface area. The first surface area is configured for attachment to a stringer base flange of a stringer and is contoured to match a contour of the stringer base flange, and the second surface area is configured for attachment to a panel surface of a composite laminate panel and is contoured to match a contour of the panel surface adjacent the terminating end of the composite stringer. The first surface area and the second surface area are positioned at different heights. The first surface area is stepped up in height relative to the second surface area. Stated differently, as the bottom surface extends from the first surface area to the second surface area, the bottom surface steps down from the first surface area to the second surface area. This positions the first surface area for clamping to the stringer base flange and positions the second surface area for clamping the stringer base flange to the composite laminate panel at the terminating end of the composite stringer. This is accomplished by leaving a small gap between the fitting second surface and the panel. For flat surfaces, the first surface area is positioned in a first plane and the second surface area is positioned in a second plane. The first plane and the second plane are different planes, and the first plane and the second plane can be parallel planes. The thickness of each fitting base flange above the first surface area decreases as the fitting base flange moves away from the terminating end of the composite stringer resulting in a gradual transfer of load.

A plurality of fastener holes extend through each fitting base flange, through the stringer base flange and through the panel for the first surface and through each fitting base flange and composite panel for the second surface. The plurality of fastener holes through each fitting base flange are positioned in a line or along a curve along the fitting base flange.

A plurality of fastener holes extend through one fitting web, through the stringer web and through the other fitting web. The plurality of fastener holes are optimally positioned in a single line along the fitting web. The single line is parallel to the fitting free edge and the fitting base flange and is positioned on the fitting web closer to the fitting free edge than to the fitting base flange which creates a local moment that counteracts stringer pull-off loads.

The stringer runout configuration also includes an I-section or blade section composite stringer. The composite stringer has a stringer base flange that is configured to engage with a panel surface of a composite laminate panel when attaching the stringer to the panel. The stringer base flange has rounded corners on opposite sides of a terminating end of the stringer to minimize strain energy peaks in the bondline between the stringer flanges and panel. The rounded corners engage with the panel. The I-section stringer has a stringer free flange opposite the stringer base flange. The stringer also has a stringer web extending between the stringer base flange and the stringer free flange. In a blade section stringer, the stringer does not have a stringer free flange, only the stringer base flange and stringer web. The stringer base flange has portions that extend outwardly from opposite sides of the stringer web. There are fastener holes through these portions of the stringer base flange. The stringer web terminating edge at the terminating end of the stringer has a curved configuration that curves toward the terminating end of the stringer as the terminating edge extends from the stringer free flange to the stringer base flange of the stringer that minimizes stringer base flange pull-off loads at the termination.

In attaching the pair of fittings to the terminating end of the stringer and to the panel, the first and second fittings of the pair of fittings are positioned on opposite sides of the stringer web. The first surface areas on the bottom surfaces of the first and second fittings engage on the stringer base flange on opposite sides of the stringer web, and the second surface areas on the bottom surfaces of the first and second fittings engage with a fabric layer of the composite laminate panel adjacent to the terminating end of the stringer.

A plurality of fasteners are positioned through the plurality of fastener holes through the fitting web of the first fitting, through the plurality of fastener holes in the stringer web, and through the plurality of fastener holes through the fitting web of the second fitting. The plurality of fasteners are tightened down, securing the pair of fittings to the opposite sides of the stringer.

A further plurality of fasteners is extended through the plurality of fastener holes through the base flanges of the first and second fittings, the plurality of fastener holes through the portions of the stringer base flange on opposite sides of the stringer web, and through the plurality of fastener holes through the panel. The further plurality of fasteners are tightened to secure the pair of fittings to the stringer base flange and to the panel.

The pair of fittings secured to the opposite sides of the stringer and secured to the panel transfer loads from the stringer at the terminating end of the stringer into the panel while reducing bondline interlaminar stresses and stringer (noodle) interlaminar stresses.

Clause 1: A stringer runout configuration comprising a fitting, a fitting web on the fitting, the fitting web being configured for attachment to a stringer web of a stringer, and a fitting base flange on the fitting, the fitting base flange having a bottom surface with a first surface area and a second surface area, the first surface area being positioned at a first height on the bottom surface of the fitting and the second surface area being positioned at a second height on the bottom surface of the fitting, the first height and second height being different heights, the first surface area being configured for attachment to a stringer base flange of a stringer and the second surface area being configured for attachment to a panel surface adjacent the stringer.

Clause 2: The stringer runout configuration of Clause 1, wherein the first surface area of the fitting has a contour that matches a contour of a base flange of a stringer, and the second surface area has a contour that matches a contour of a panel adjacent the stringer.

Clause 3: The stringer runout configuration of Clause 1 or Clause 2, further comprising a stringer, the stringer having a terminating end, the stringer having a stringer base flange that is configured to engage with a panel surface and an opposite stringer free flange, the stringer having a stringer web between the stringer base flange and the stringer free flange, the stringer web having a terminating edge at the terminating end of the stringer, the terminating edge having a curved configuration that curves toward the terminating end of the stringer as the terminating edge extends from the stringer free flange to the stringer base flange. The free flange is a feature of the I-section stringer, but not of the blade stringer.

Clause 4: The stringer runout configuration of Clause 3, wherein the first surface area of the bottom surface of the fitting base flange is attached to the stringer base flange and the second surface area of the bottom surface of the fitting base flange is attached to a panel surface.

Clause 5: The stringer runout configuration of Clause 4, further comprising a layer of fiber fabric on the panel surface, the stringer base flange being attached to the layer of fiber fabric and the second surface area on the bottom surface of the fitting base flange being attached to the fiber fabric.

Clause 6: The stringer runout configuration of any of Clauses 3-5, wherein the stringer base flange has a terminating end at the terminating end of the stringer, the terminating end of the stringer base flange having rounded corners on opposite sides of the stringer web.

Clause 7: The stringer runout configuration of any of Clauses 3-5, further comprising a second fitting, the first fitting and the second fitting being attached to the stringer and panel on opposite sides of the stringer web.

Clause 8: The stringer runout configuration of Clause 7, further comprising a plurality of fasteners extending through a fitting web of the first fitting, the stringer web, and through a fitting web of the second fitting, the plurality of fasteners securing the first fitting and the second fitting to opposite sides of the stringer.

Clause 9: The stringer runout configuration of Clause 8, further comprising a further plurality of fasteners extending through a fitting base flange of the first fitting and a fitting base flange of the second fitting, through the stringer base flange, and through a panel, the further plurality of fasteners securing the first fitting and the second fitting to the stringer base flange and the panel.

Clause 10: A stringer runout configuration comprising a fitting, a fitting web on the fitting, the fitting web being configured for attachment to a stringer web of a stringer, a fitting base flange on the fitting, the fitting base flange having a bottom surface, the bottom surface being configured for attachment to a stringer base flange of a stringer and a panel, a fitting free edge on the fitting, the fitting free edge being on the fitting web on an opposite side of the fitting web from the fitting base flange, and a plurality of fastener holes through the fitting web, the plurality of fastener holes being optimally positioned in a single line along the fitting web for example, the single line being positioned on the fitting web closer to the fitting free edge than to the fitting base flange.

Clause 11: The stringer runout configuration of Clause 10, wherein the single line can be parallel to the fitting free edge.

Clause 12: The stringer runout configuration of Clause 10 or 11, further comprising a panel surface and a stringer, the stringer having a terminating end, the stringer having a stringer base flange that is attached to the panel surface and an opposite stringer free flange, the stringer having a stringer web between the stringer base flange and the stringer free flange, the stringer web having a terminating edge at the terminating end of the stringer, the terminating edge having a curved configuration that curves toward the terminating end of the stringer as the terminating edge extends from the stringer free flange to the stringer base flange, wherein the fitting web on the fitting is secured to the stringer web.

Clause 13: The stringer runout configuration of Clause 12, wherein the stringer base flange has a terminating end at the terminating end of the stringer, the terminating end of the stringer base flange having rounded corners on opposite sides of the stringer web.

Clause 14: The stringer runout configuration of Clause 12, wherein the bottom surface of the fitting base flange has a first surface area and a second surface area, the first surface area of the bottom surface of the fitting base flange engages with the stringer base flange, and the second surface area of the bottom surface of the fitting base flange engages with the panel surface.

Clause 15: The stringer runout configuration of Clause 14, further comprising a layer of fiber fabric on the panel surface, wherein the stringer base flange engages with the layer of fiber fabric and wherein the second surface area of the bottom surface of the fitting base flange engages with the fiber fabric.

Clause 16: The stringer runout configuration of any of Clauses 12-15, further comprising a second fitting, the first fitting and the second fitting engaging with the stringer on opposite sides of the stringer web.

Clause 17: The stringer runout configuration of Clause 16, further comprising a further plurality of fasteners extending through fastener holes through a fitting web of the first fitting, the stringer web, and through a fitting web of the second fitting, the plurality of fasteners securing the first fitting and the second fitting to opposite sides of the stringer.

Clause 18: The stringer runout configuration of Clause 17, further comprising a further plurality of fasteners extending through the first and second fitting base flanges, through the stringer base flange, and through a panel, the further plurality of fasteners securing the first fitting and the second fitting to the stringer base flange and to the panel.

Clause 19: A method comprising positioning a stringer base flange of a stringer on a panel surface; positioning a fitting on a terminating end of the stringer, the fitting having a fitting web; attaching the fitting web to a stringer web of the stringer; attaching a first surface area on a bottom surface of a fitting base flange on the fitting to the stringer base flange; and attaching a second surface area on the bottom surface of the fitting base flange to the panel surface where the first surface area of the fitting base flange and the second surface area of the fitting base flange are positioned at different heights.

Clause 20: The method of Clause 19, further comprising inserting fasteners through fastener holes through the first fitting web, through the stringer web and through the second fitting web, the fastener holes being positioned along a straight line, the straight line being closer to a fitting free edge on the fitting web that is on an opposite side of the fitting web from the fitting base flange.

The features, functions, and advantages that have been discussed can be achieved independently in various examples or may be combined in yet other examples, further details of which can be seen with reference to the following description and drawings.

DETAILED DESCRIPTION

Figure 1:
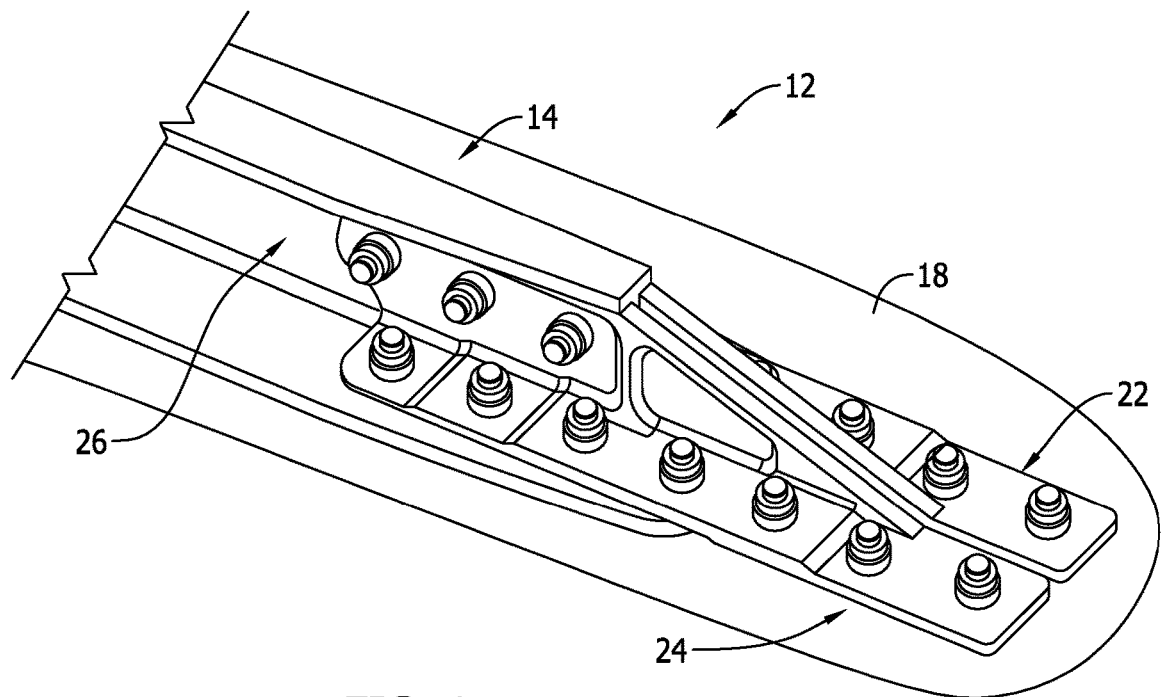
FIG. 1 is a representation of a perspective view of the stringer runout configuration of this disclosure and of the terminating end portion of a stringer and a portion of the composite laminate panel.
Figure 2:
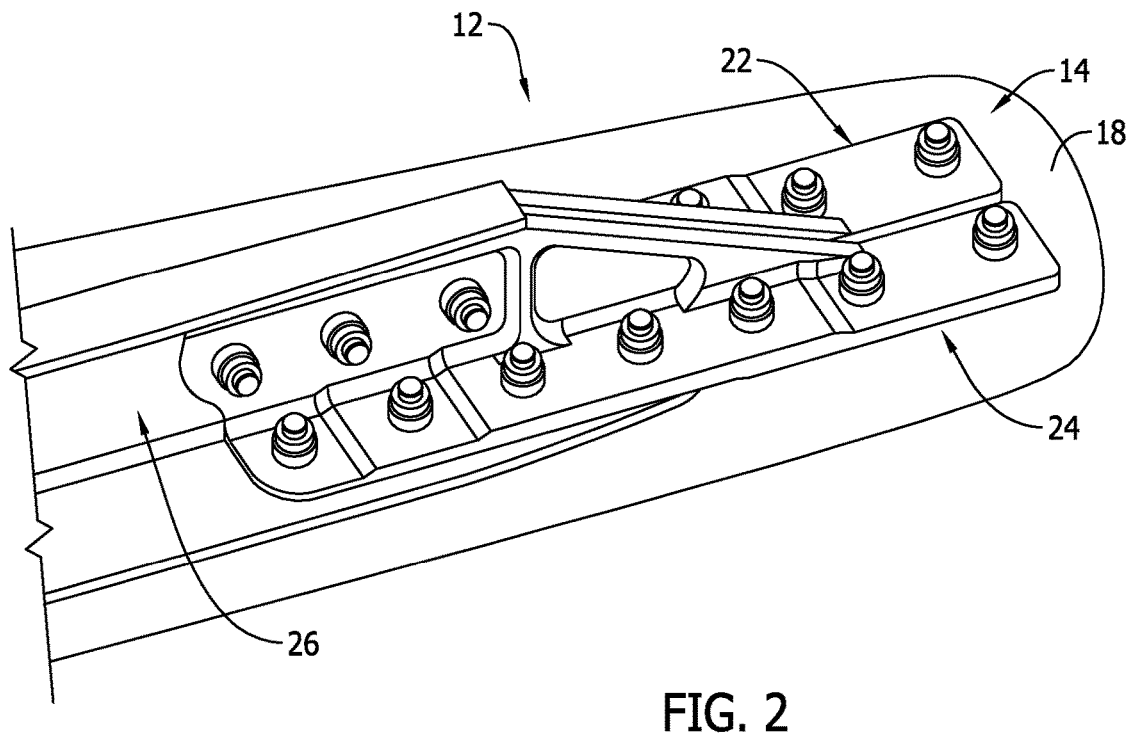
FIG. 2 is a representation of a perspective view of the stringer runout configuration of this disclosure and of the terminating end portion of a stringer and panel similar to that of FIG. 1, but from a different point of view.
Figure 3:
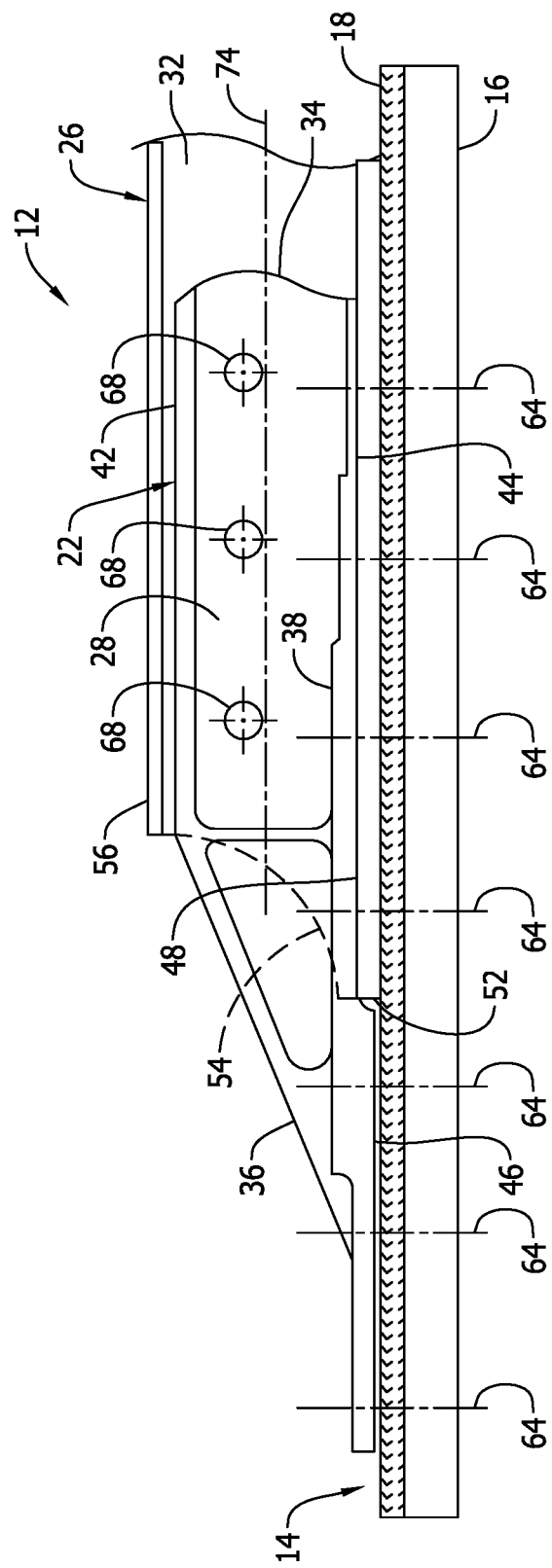
FIG. 3 is a representation of a side elevation view of the stringer runout configuration and the terminating end portion of a stringer and panel.
Figure 4:
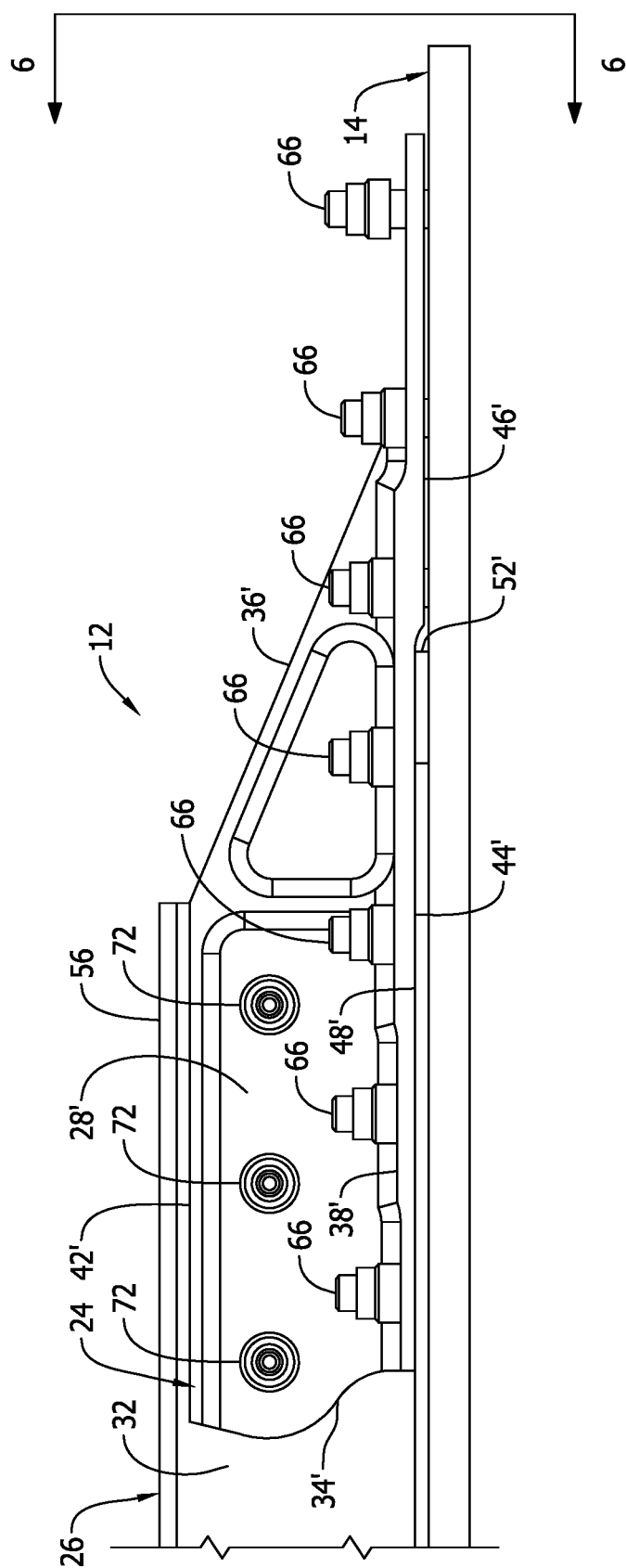
FIG. 4 is a representation of a side elevation view of the stringer runout configuration and the terminating end portion of a stringer and panel including fasteners from the opposite side of the stringer than that represented in FIG. 3.
Figure 6:
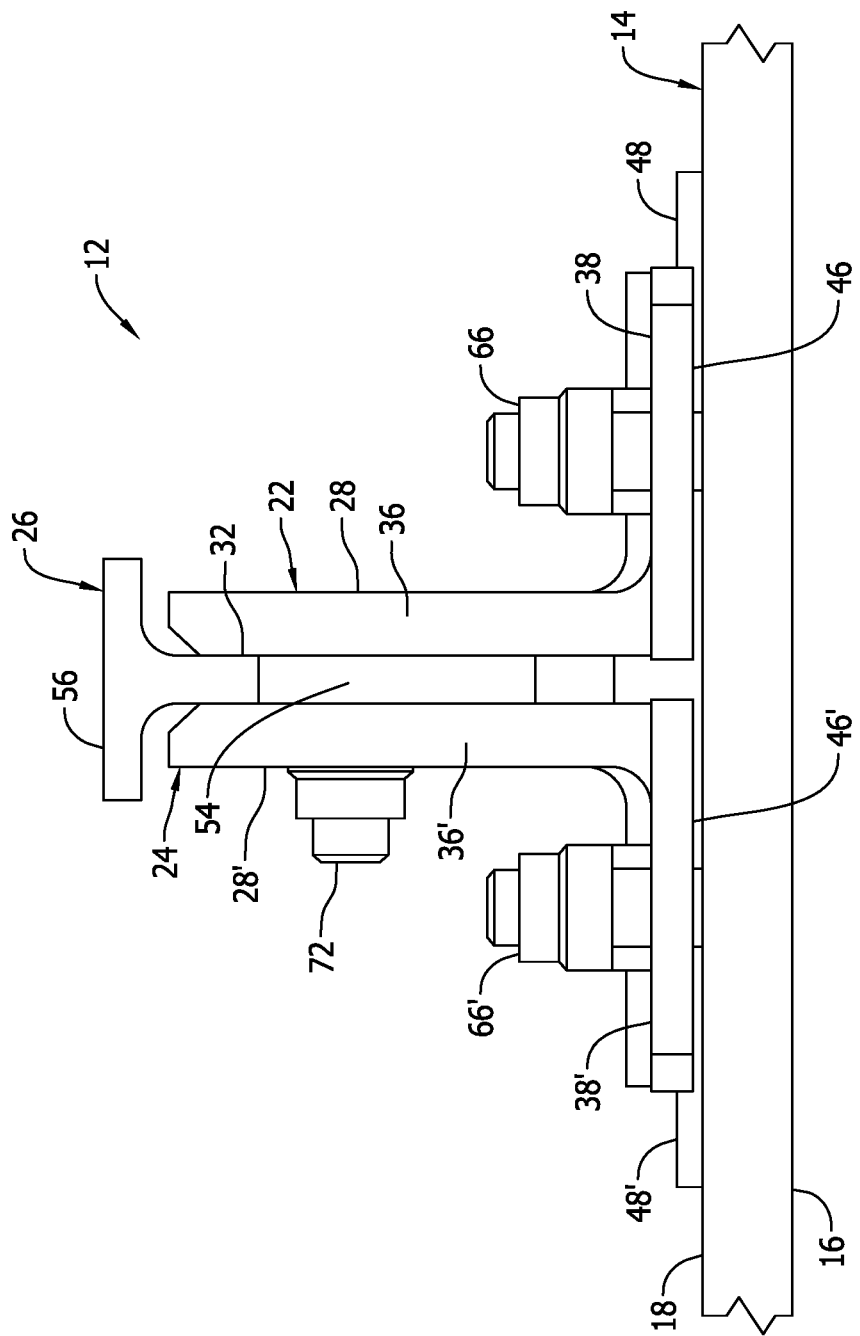
FIG. 6 is a representation of an end elevation view of the stringer runout configuration and the terminating edge of the terminating end portion of the stringer and panel in a plane along the line 6-6 of FIG. 4.

FIGS. 3, 4 and 6 are representations of the stringer runout configuration 12 of this disclosure secured to a composite laminate panel 14, for example, carbon fibers in an epoxy matrix. Referring to FIGS. 3, 4 and 6, the composite laminate panel 14 is represented as being comprised of an outer layer 16 of composite material such as unidirectional tape plies, and an inner layer 18 comprised of woven fabric plies such as carbon fiber fabric plies. The composite laminate panel 14 and specifically the outer layer panel plies 16 could form an exterior surface of an aircraft primary structure such as a wing main torque box or an empennage torque box, or other equivalent structure. The use of fabric plies 18 for the inner layer of the composite laminate panel 14 provides a greater fracture toughness at the stringer interface than the unidirectional tape plies 16. The fabric plies of the inner layer 18 increase the bondline fracture toughness between the composite stringer runout and the composite laminate panel 14 and reduce the risk of delaminations propagating to the weaker unidirectional tape of the outer layers 16 in the composite laminate panel 14 thereby allowing the stringer runout configuration to sustain higher interlaminar stresses prior to fracture initiation.

As represented in FIGS. 1, 2, 5 and 6, the stringer runout configuration 12 is comprised of a pair of fittings, including a first fitting 22 and a second fitting 24, and a stringer 26. The fittings 22, 24 are constructed of a metal, for example titanium. A material such as titanium is used for its strength and to provide weight efficient stiffness, and to minimize differential thermal expansion loading in the connection between the stringer runout fittings 22, 24, the stringer 26 and panel 14. In this disclosure the pair of fittings 22, 24 are constructed as mirror images of each other and reference numbers used to describe the first fitting 22 will also be used to describe the second fitting 24, with the reference numbers used to describe the second fitting 24 being followed by a prime ('). However, it should be understood that it is not necessary that the pair of fittings 22, 24 have configurations that are mirror images of each other, but will have similar geometry.

Each of the fittings 22, 24 is constructed with a fitting web 28, 28' at a central portion of the fitting. The fitting web 28, 28' is configured for attachment to a stringer web 32 of the stringer 26. Thus, the fitting web 28, 28' is planar to engage in surface contact with the stringer web 32. The fitting web 28, 28' has a proximal edge 34, 34' and an opposite distal edge 36, 36'. Each of the fittings 22, 24 is also constructed with a fitting base flange 38, 38' that extends along a first edge of the fitting web 28, 28'. As represented in FIG. 6, the fitting base flange 38, 38' projects at an angle outwardly from, and in this disclosure a right angle outwardly from the first edge or bottom edge of the fitting web 28, 28'. Each of the fittings 22, 24 is also constructed with a fitting free edge 42, 42' along a second edge of the fitting web 28, 28' on an opposite side of the fitting web 28, 28' from the fitting base flange 38, 38'.

As represented in FIGS. 3 and 4, the fitting base flange 38, 38' of each of the fittings 22, 24 is constructed with a bottom surface on an opposite side of the fitting base flange 38, 38' from the fitting web 28, 28'. The bottom surface of the fitting base flange 38, 38' has a first surface area 44, 44' and a second surface area 46, 46'. The first surface area 44, 44' and the second surface area 46, 46' are positioned at different heights. The second surface area 46, 46' is stepped down in height relative to the first surface area 44, 44'. This positions the first surface area 44, 44' for clamping the stringer base flange 48, 48' to the composite laminate panel 14 at the terminating end 54 of the composite stringer. For flat bottom surfaces of the fitting base flange 38, 38', the first surface area 44, 44' is flat and positioned in a first plane and the second surface area 46, 46' is flat and positioned in a second plane. The first plane of the first surface area 44, 44' and the second plane of the second surface area 46, 46' are different planes. The thickness of each fitting base flange 38, 38' above the first surface area 44, 44' decreases as the fitting base flange 38, 38' moves away from the terminating end 52, 52' of the stringer 26 resulting in a gradual transfer of load.

As represented in FIGS. 3 and 4, the first surface areas 44, 44' of the bottom surface of the fitting base flanges 38, 38' are positioned at a height above the second surface areas 46, 46'. This gives the first surface areas 44, 44' a configuration and a contour for attachment of the first surface areas 44, 44' on top of portions of the composite stringer base flange 48, 48' that extend outwardly from a first edge or bottom edge of the stringer web 32 as represented in FIGS. 3, 4 and 6. This configures the first surface areas 44, 44' of the first fitting 22 and the second fitting 24 for attachment to the portions of the composite stringer based flange 48, 48' on the opposite sides of the stringer web 32.

As represented in FIGS. 3 and 4, the bottom surface of the fitting base flange 38, 38' then steps down from the first surface area 44, 44' to the second surface area 46, 46'. This positions the second surface areas 46, 46' of the first fitting 22 and the second fitting 24 for engagement on top of the composite laminate panel 14, and specifically for engagement on top of the fabric layer ply or plies 18 of the composite laminate panel 14. The stepped down position of the second surface areas 46, 46' from the first surface areas 44, 44' configures the second surface areas 46, 46' for attachment to the panel plies 14 and in particular the inner layer of fabric panel ply or plies 18 immediately adjacent the terminating ends 52, 52' of the portions of the composite stringer base flange 48, 48' on opposite sides of the stringer web 32.

Figure 5:
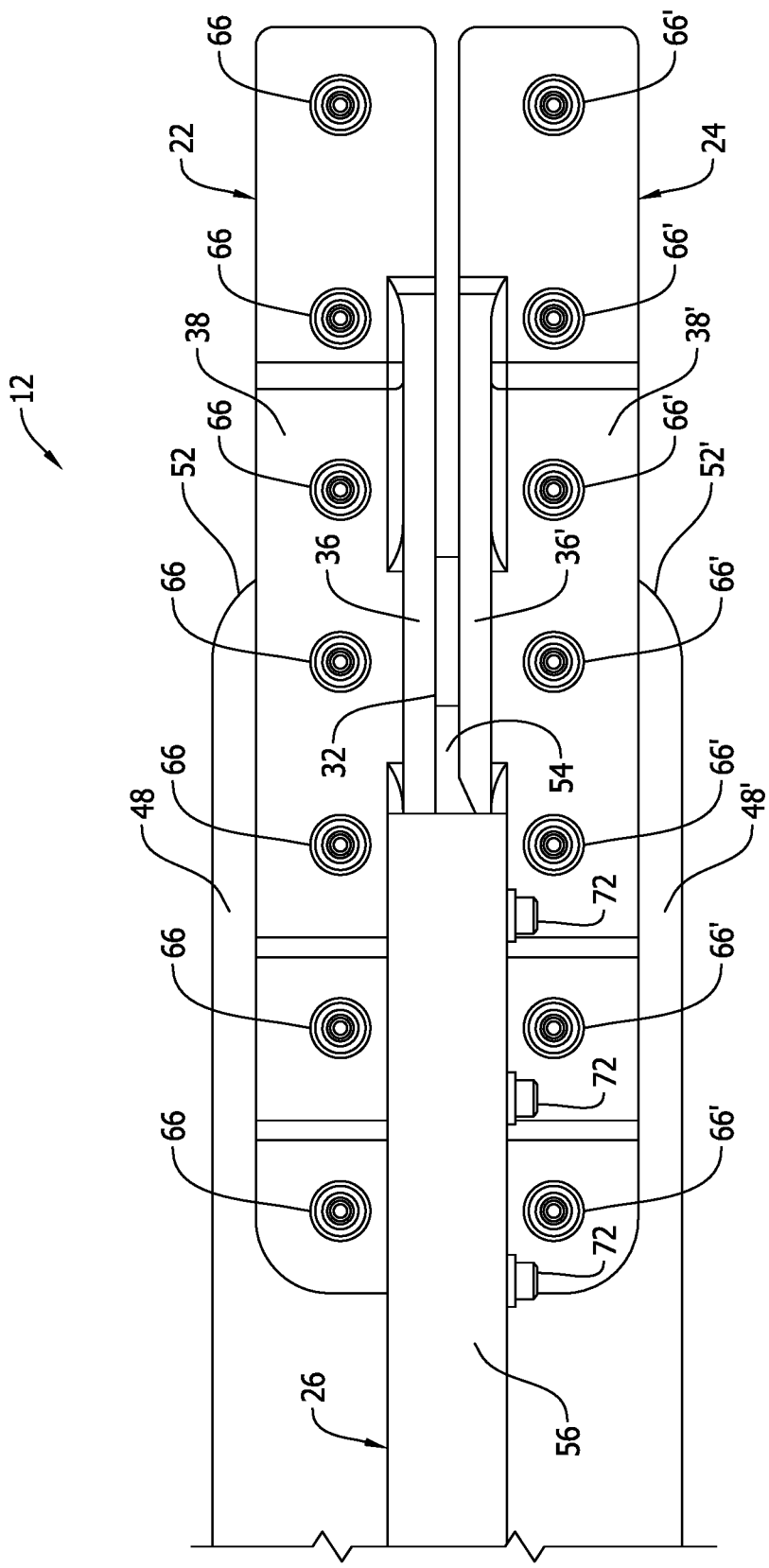
FIG. 5 is a representation of a top plan view of the stringer runout configuration and the terminating end portion of the stringer.

As represented in FIG. 5, the terminating end portions 52, 52' of the composite stringer base flange have rounded corner configurations. The rounded corner configurations of the terminating ends 52, 52' of the portions of the composite stringer base flange 48, 48' minimize bondline strain energy peaks occurring at the corners of the terminating ends 52, 52' between the composite stringer base flange 48, 48' and the panel 14.

As represented in FIG. 3, the stringer web 32 has a terminating edge 54 that extends between the portions of the stringer base flange 48, 48' and a stringer free flange 56 that is on an opposite side of the stringer web 32 from the stringer base flange portions 48, 48'. The stringer terminating edge 54 has a curved configuration that curves toward the terminating ends 52, 52' of the portions of the stringer base flange 52, 52' as the terminating edge 54 extends from the stringer free flange 56 to the terminating end portions of the stringer base flange 52, 52'. This configuration of the stringer terminating edge 54 minimizes pull-off forces at the terminating end portions of the composite stringer base flange 52, 52' and the composite laminate panel 14.

The rounded corners on the terminating end portions of the stringer base flange 52, 52' minimize bondline strain energy peaks at the bond between the terminating end portions of the stringer base flange 52, 52' and the composite laminate panel 14.

A plurality of fastener holes extend through each fitting base flange 38, 38'. Positions of the plurality of fastener holes through each fitting base flange 38, 38' are represented by dashed lines 64 in FIG. 3. Fasteners 66, 66' inserted through the plurality of fastener holes 64 through each fitting base flange 38, 38' are represented in FIGS. 4, 5 and 6. The positions of the fastener holes 64 represented in FIG. 3 and the fasteners 66, 66' extending through the fastener holes represented in FIGS. 4, 5 and 6 are positioned along a curve or in a line along the fitting base flanges 38, 38'.

A plurality of fastener holes extend through each fitting web 28, 28' and through the stringer web 32. The positions of the fastener holes through the fitting webs 28, 28' and through the stringer web 32 are represented by dashed lines 68 in FIG. 3. Fasteners 72 inserted through the plurality of fastener holes extending through the fitting webs 28, 28' and extending through the stringer web 32 are represented in FIGS. 4 and 6. As represented in FIG. 3, the positions of the fastener holes 68 through the fitting webs 28, 28' and through the stringer web 32 are arranged in a line that is parallel to the fitting base flanges 38, 38', the stringer base flanges 48, 48' and the fitting free edges 42, 42', and are above a center line of the fitting webs 28, 28' and the stringer web 32 represented by the dashed lines 74 in FIG. 3. This positions the fastener holes 68 and the fasteners 72 inserted through the fastener holes in the fitting web 28, 28' closer to the fitting free edge 42, 42' than the fitting base flange 38, 38'. This positioning of the fasteners 72 creates a local moment at the terminating end of the stringer 26 that counteracts stringer pull-off loads.

In one example of securing the composite stringer 26 to the composite laminate panel 14, the stringer 26 is first formed of composite material with the curved configuration of the terminating edge 54 of the stringer web 32 represented in FIG. 3, and with the rounded terminating end portions of the stringer base flange 52, 52' represented in FIG. 5 machined post cure. The composite stringer 26 is pre-cured before its attachment to the composite laminate panel 14.

The pre-cured stringer 26 is then positioned on the composite laminate panel 14. As represented in FIGS. 3 and 6, the pre-cured stringer 26 is positioned on the inner layer panel ply 18. The inner layer panel ply 18 in this example is fabric such as carbon fiber fabric. The inner layer or layers of panel plies 18 of fabric material could be one layer or ply, or could be a multiple of layers or plies. The layer or layers of fiber fabric that make up the inner layer panel ply or plies 18 are laid up on the outer layer panel plies 16 which in this example are plies of unidirectional carbon fiber tape plies. The inner layer panel plies 18 and the outer layer panel plies 16 are uncured.

With the pre-cured stringer 26 positioned on the uncured inner layer panel plies 18 and the uncured outer layer panel plies 16, the uncured composite laminate panel 14 and the pre-cured stringer 26 are bagged with a vacuum bag in preparation for an autoclave curing process.

Figure 7:
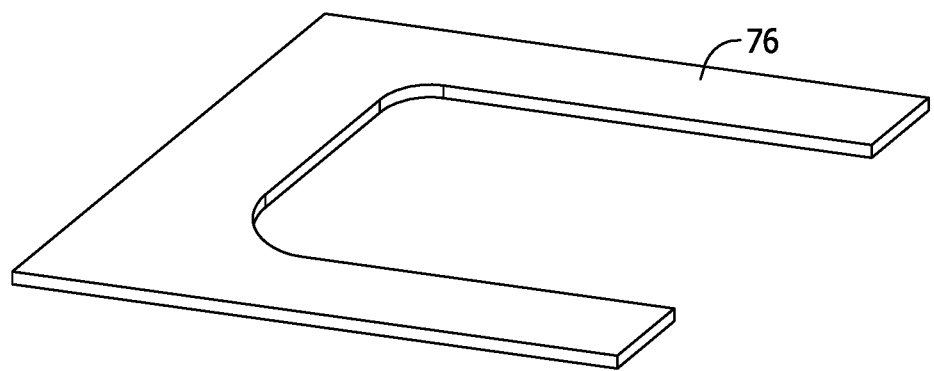
FIG. 7 is a representation of a perspective view of a caul plate.
Figure 8:
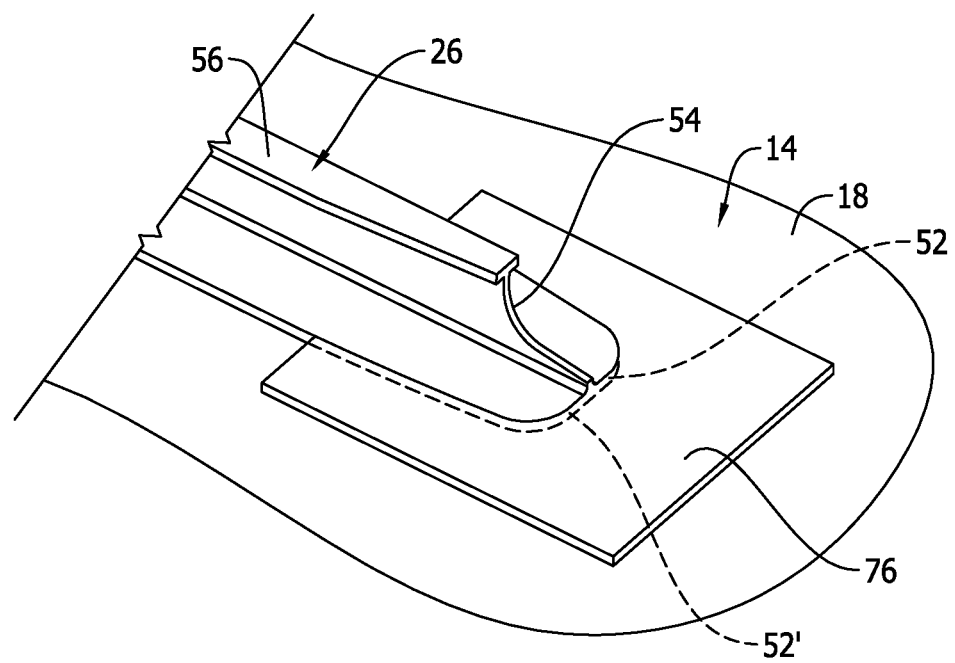
FIG. 8 is a representation of the caul plate of FIG. 7 positioned adjacent the terminating end portion of the stringer and the panel of FIG. 1.

Prior to the stringer 26 and the composite laminate panel 14 being bagged and autoclaved, a caul plate 76 such as that represented in FIGS. 7 and 8 is positioned on the composite laminate panel 14 adjacent the terminating end portions 52, 52' of the stringer base flange. In the autoclave process, as the vacuum bag is pulled down on the terminating end portions 52, 52' of the stringer base flange and on the composite laminate panel 14 adjacent the terminating end portions 52, 52' of the stringer base flange, the caul plate 76 will be pulled down on the composite laminate panel 14 and will limit the height of any bow wave formed in the composite laminate panel 14 adjacent the terminating end portions 52, 52' of the stringer base flange. Following the autoclave process, the caul plate 76 is removed and the pair of fittings 22, 24 are secured to the terminating end of the stringer 26.

In attaching the pair of fittings 22, 24 to the terminating end of the stringer 26 and to the composite laminate panel 14, the first fitting 22 and second fitting 24 of the pair of fittings are positioned on opposite sides of the stringer web 32 as represented in FIGS. 1-6. The first surface areas 44, 44' on the bottom surfaces of the first 22 and second 24 fittings engage on the portions of the stringer base flange 48, 48' on the opposite sides of the stringer web 32. The second surface areas 46, 46' on the bottom surfaces of the first 22 and second 24 fittings engage with the fabric layer 18 of the composite laminate panel 14 adjacent the terminating end portions 52, 52' of the stringer base flange.

The plurality of fasteners 72 are inserted through the aligned plurality of fastener holes 68 through the fitting web 28 of the first fitting 22, through the stringer web 32 of the stringer 26, and through the fitting web 28' of the second fitting 24. The plurality of fasteners 72 are tightened down, securing the pair of fittings 22, 24 to the opposite sides of the stringer 26.

As represented in FIGS. 3-6, a further plurality of fasteners 66, 66' are extended through the plurality of fastener holes 64 through the base flanges 38, 38' of the first fitting 22 and second fitting 24, through the plurality of fastener holes 64 through the portions 48, 48' of the stringer base flange on opposite sides of the stringer web 32, and through the plurality of fastener holes 64 through the panel 14. The further plurality of fasteners 66, 66' are tightened down to secure the pair of fittings 22, 24 to the stringer 26 and to the panel 14.

The pair of fittings 22, 24 secured to the opposite sides of the stringer 26 and secured to the panel 14 help transfer loads from the stringer 26 at the terminating end into the panel 14. The pair of fittings 22, 24 secured to the stringer web 32, the stringer base flanges 48, 48' on opposite sides of the stringer web 32 and to the panel 14 help transfer loads from the stringer 26 into the panel 14 while reducing bondline interlaminar stresses and stringer (noodle) interlaminar stresses.

As various modifications could be made in the construction of the stringer runout configuration and its method of use herein described and illustrated without departing from the scope of the disclosure, it is intended that all matter contained in the foregoing description or shown in the accompanying drawings shall be interpreted as illustrative rather than limiting. Thus, the breadth and scope of the present disclosure should not be limited by any of the above described exemplary examples, but should be defined only in accordance with the following claims appended hereto and their equivalents.

The invention claimed is:

1. A stringer runout configuration for an aircraft, the stringer runout configuration comprising:
   a fitting;
   a fitting web on the fitting, the fitting web being configured for attachment to a stringer web of a stringer, wherein the stringer has a terminating end;
   a fitting base flange on the fitting, the fitting base flange having a bottom surface with a first surface area and a second surface area, the first surface area being positioned at a first height on the bottom surface of the fitting and the second surface area being positioned at a second height on the bottom surface of the fitting, the first height and second height being different heights, the first surface area being configured for attachment to a stringer base flange of the stringer and the second surface area being configured for attachment to a panel surface adjacent the stringer;
   wherein the fitting base flange has a thickness that overlaps the first surface area when the stringer and the fitting are attached to each other, and the thickness decreases in size over the first surface area as the fitting base flange extends away from the terminating end of the stringer;
   a fitting free edge on the fitting, the fitting free edge being on the fitting web on an opposite side of the fitting web from the fitting base flange;
   wherein the fitting web defines a plurality of fastener holes aligned with each other in a single line;
   wherein the single line of the plurality of fastener holes is positioned on the fitting web closer to the fitting free edge than to the fitting base flange; and
   wherein the single line of the plurality of fastener holes is parallel to the fitting free edge and parallel to the fitting base flange.

2. The stringer runout configuration of claim 1, wherein: the stringer has the stringer base flange that is configured to engage with the panel surface and a stringer free flange disposed opposite of the stringer base flange, wherein the stringer web is disposed between the stringer base flange and the stringer free flange, and the stringer base flange and the stringer free flange each extend outwardly transverse to the stringer web, the stringer web having a terminating edge at the terminating end of the stringer, the terminating edge having a curved configuration that curves toward the terminating end of the stringer as the terminating edge extends from the stringer free flange to the stringer base flange.

3. The stringer runout configuration of claim 2, wherein: the stringer base flange has a terminating end at the terminating end of the stringer, the terminating end of the stringer base flange having rounded corners on opposite sides of the stringer web.

4. The stringer runout configuration of claim 2, wherein: the first surface area of the bottom surface of the fitting base flange is attached to the stringer base flange; and the second surface area of the bottom surface of the fitting base flange is attached to the panel surface.

5. The stringer runout configuration of claim 4, further comprising:
   a layer of fiber fabric on the panel surface comprised of one or more plies;
   the stringer base flange being attached to the layer of fiber fabric; and
   the second surface area of the bottom surface of the fitting base flange being attached to the layer of fiber fabric.

6. The stringer runout configuration of claim 2, further comprising:
the fitting being a first fitting;
the fitting web being a first fitting web;
a second fitting having a second fitting web defining a plurality of fastener holes; and
the first fitting and the second fitting being attached to the stringer on opposite sides of the stringer web, and the stringer web defines a plurality of fastener holes.

7. The stringer runout configuration of claim 6, further comprising:
a plurality of fasteners extending through the plurality of fastener holes of the first fitting web of the first fitting, the stringer web, and the second fitting web of the second fitting, wherein the plurality of fasteners secure the first fitting and the second fitting to opposite sides of the stringer.

8. The stringer runout configuration of claim 7, further comprising:
the fitting base flange being a first fitting base flange of the first fitting; and
a further plurality of fasteners extend through the first fitting base flange of the first fitting, a second fitting base flange of the second fitting, the stringer base flange, and a panel, wherein the further plurality of fasteners secure the first fitting and the second fitting to the stringer base flange and the panel.

9. The stringer runout configuration of claim 7, wherein:
the plurality of fastener holes of the first fitting web of the first fitting, the stringer web, and the second fitting web of the second fitting align with each other in the single line.

10. The stringer runout configuration of claim 1, wherein:
the first surface area has a contour that matches a contour of the stringer base flange of the stringer; and
the second surface area has a contour that matches a contour of a panel adjacent the stringer.

11. A stringer runout configuration for an aircraft, the stringer runout configuration comprising:
a stringer including a stringer web and a stringer base flange;
a fitting;
a fitting web on the fitting, the fitting web attached to the stringer web of the stringer;
a fitting base flange on the fitting, the fitting base flange having a bottom surface that is attached to the stringer base flange of the stringer and configured for attachment to a panel;
a fitting free edge on the fitting, the fitting free edge being on the fitting web on an opposite side of the fitting web from the fitting base flange;
a plurality of fastener holes through the fitting web, the plurality of fastener holes being aligned with each other to form a single line only along the fitting web, the single line being positioned on the fitting web closer to the fitting free edge than to the fitting base flange;
wherein the single line of the plurality of fastener holes is parallel to the fitting free edge and parallel to the stringer base flange;
wherein the stringer has a terminating end;
wherein the bottom surface of the fitting base flange has a first surface area and a second surface area; and
wherein the fitting base flange has a thickness that overlaps the first surface area, and the thickness decreases in size over the first surface area as the fitting base flange extends away from the terminating end of the stringer.

12. The stringer runout configuration of claim 11, wherein: the single line of the plurality of fastener holes is parallel to the fitting base flange.

13. The stringer runout configuration of claim 11: further comprising a panel surface;
wherein the stringer having the stringer base flange that is attached to the panel surface and a stringer free flange disposed opposite of the stringer base flange, wherein the stringer web is disposed between the stringer base flange and the stringer free flange which cooperate with each other to form an I-section configuration, the stringer web having a terminating edge at the terminating end of the stringer, the terminating edge having a curved configuration that curves toward the terminating end of the stringer as the terminating edge extends from the stringer free flange to the stringer base flange; and
wherein the fitting web on the fitting is secured to the stringer web.

14. The stringer runout configuration of claim 13, wherein:
the stringer base flange has a terminating end at the terminating end of the stringer, the terminating end of the stringer base flange having rounded corners on opposite sides of the stringer web.

15. The stringer runout configuration of claim 13, wherein:
the first surface area of the bottom surface of the fitting base flange engages with the stringer base flange; and
the second surface area of the bottom surface of the fitting base flange engages with the panel surface.

16. The stringer runout configuration of claim 15, further comprising:
a layer of fiber fabric on the panel surface;
wherein the stringer base flange engages with the layer of fiber fabric; and
wherein the second surface area of the bottom surface of the fitting base flange engages with the layer of fiber fabric.

17. The stringer runout configuration of claim 13, further comprising:
the fitting is a first fitting;
a second fitting; and
the first fitting and the second fitting engaging with the stringer on opposite sides of the stringer web, and the stringer web defines a plurality of fastener holes.

18. The stringer runout configuration of claim 17:
wherein the fitting web is a first fitting web defining the plurality of fastener holes;
further comprising a second fitting web of the second fitting, wherein the second fitting web defines a plurality of fastener holes; and
further comprising a plurality of fasteners extend through the plurality of fastener holes of the first fitting web of the first fitting, the stringer web, and the second fitting web of the second fitting, wherein the plurality of fasteners secure the first fitting and the second fitting to opposite sides of the stringer.

19. The stringer runout configuration of claim 18:
wherein the fitting base flange is a first fitting base flange;
further comprising a second fitting base flange of the second fitting; and
further comprising a further plurality of fasteners extending through the first fitting base flange and the second fitting base flange, through the stringer base flange, and through the panel, the further plurality of fasteners securing the first fitting and the second fitting to the stringer base flange and to the panel.

20. A method of forming a stringer runout configuration for an aircraft, the method comprising:
- positioning a stringer base flange termination of a stringer on a panel surface;
- positioning a caul plate at the stringer base flange termination and curing a panel;
- positioning a first fitting and a second fitting on a terminating end of the stringer, the first fitting having a first fitting web and the second fitting having a second fitting web;
- attaching the first fitting web to a stringer web of the stringer;
- attaching a first surface area on a bottom surface of a fitting base flange of the first fitting to a stringer base flange of the stringer, wherein the fitting base flange of the first fitting has a thickness that overlaps the first surface area, and the thickness decreases in size over the first surface area as the fitting base flange of the first fitting extends away from the terminating end of the stringer;
- attaching a second surface area on the bottom surface of the fitting base flange of the first fitting to the panel surface where the first surface area of the fitting base flange of the first fitting and the second surface area of the fitting base flange of the first fitting are positioned at different heights; and
- inserting fasteners through respective fastener holes of the first fitting web, the stringer web and the second fitting web to sandwich the stringer web between the first fitting web and the second fitting web, wherein the fastener holes of the first fitting web are positioned along a straight line that forms a single line only, the fastener holes of the stringer web are positioned along a straight line, and the fastener holes of the second fitting web are positioned along a straight line, wherein the straight line of the fastener holes of the first fitting web is disposed closer to and parallel to a fitting free edge on the first fitting web and parallel to the stringer base flange, the straight line of the fastener holes of the second fitting web is disposed closer to and parallel to a fitting free edge on the second fitting web and parallel to the stringer base flange, and the straight line of the fastener holes of the stringer web aligns between the straight line of the fastener holes of the first fitting web and the straight line of the fastener holes of the second fitting web, and wherein the fitting free edge of the first fitting web is on an opposite side from the fitting base flange of the first fitting, and the fitting free edge of the second fitting web is on an opposite side from a fitting base flange of the second fitting.

* * * * *